Patented June 29, 1943

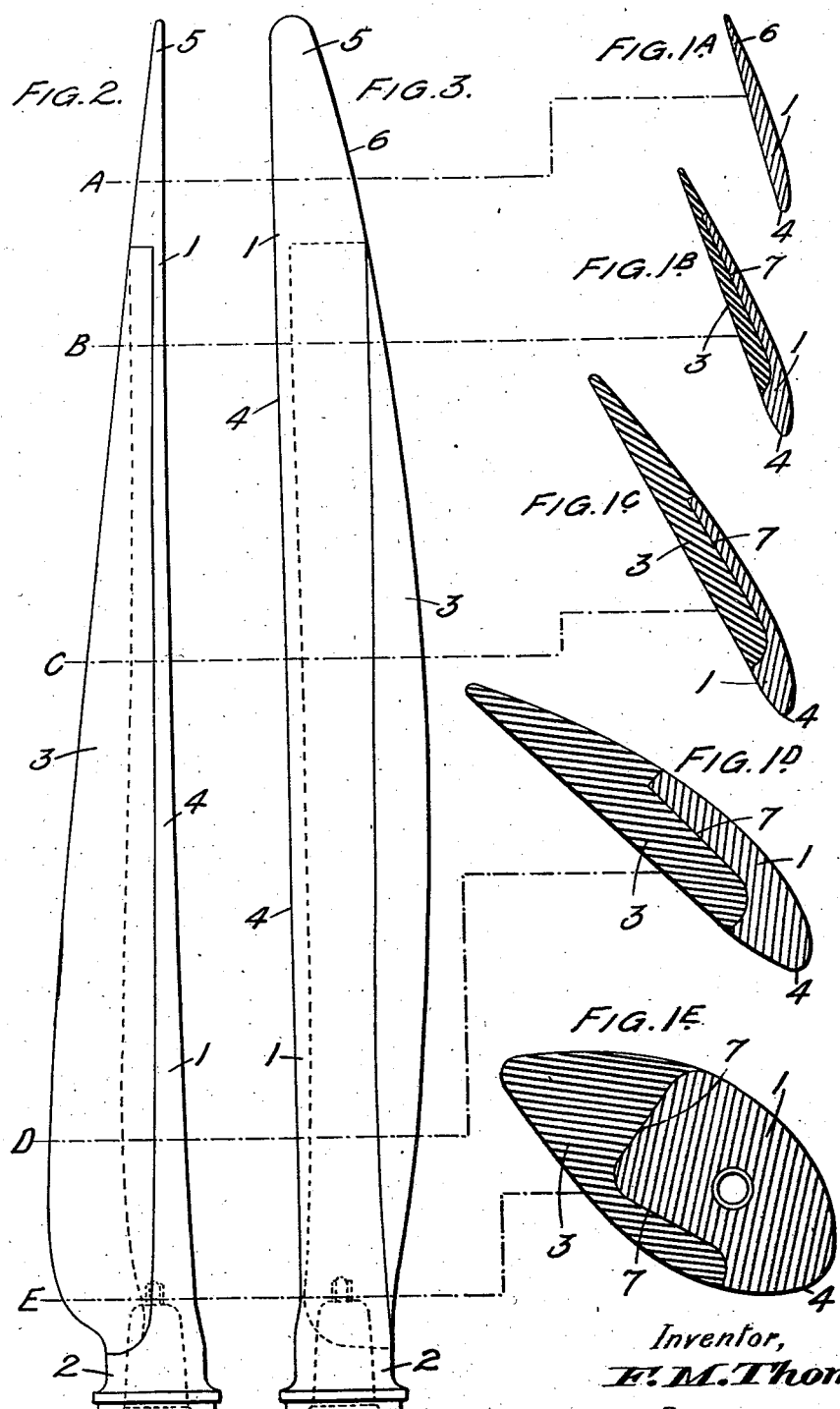

2,323,165

UNITED STATES PATENT OFFICE 2,323,165

AIRSCREW

Frederick Metcalf Thomas, Hatfield, England, assignor to The De Havilland Aircraft Company Limited, Hatfield, England Application August 21, 1939, Serial No. 291,271
In Great Britain September 1, 1938

7 Claims. (Cl. 170—159)

This invention relates to airscrews, and in particular to the construction of blades thereof. The primary object of the invention is to provide a composite blade construction which will enable a blade to be light in weight whilst being sufficiently resistant to the loads to be met. An advantage of the invention as applied to variable pitch airscrews lies in the reduction of the natural centrifugal torque of the blades. Another advantage is that undue stress concentrations are avoided at the blade root.

The present invention is concerned with the manufacture of blades in composite form, in which there is a main load-carrying part of relatively high-tensile dense metal such as steel, light alloy, or the like, which may also constitute the more vulnerable parts of the aerodynamic profile and area of the blade, and a second part the primary purpose of which is not to carry load but to complete the aerodynamic profile and area of the blade and which, although necessarily carrying some loads, e. g., that due to its own centrifugal force and its own proportion of the aerodynamic loading, can be relatively weak. Such second part is therefore of relatively low-tensile, light material, and it is of the essence of the invention that it is employed as solid, homogeneous, mouldable material. Within the term "mouldable" I intend to include such working as "casting," or working whilst plastic, with subsequent setting. Examples of such material are synthetic resins, or expanded rubber or expanded metal of which the cellular distribution is substantially uniform and which can therefore be regarded as homogeneous and solid.

According to this invention, an airscrew blade comprises a first relatively strong part of one homogeneous material adapted to be attached to a hub and to transmit all forces between blade and hub and forming part of the profile of the blade, and a second relatively less strong part of another homogeneous material of which the external surface superficies complete the blade profile, the parts having complementary joining surfaces over the whole of which they meet and are joined by adhesion, the second part being formed, at least as to its joining surface, by moulding (in which term I include casting) so as to be exactly complementary to the joining surface of the first part. The adhesion may be achieved in the same manufacturing step or operation as the final formation of the joining surface of the second part, e. g., by the exercise of heat and pressure in vulcanising of a rubber second part; or in the forming of a thermo-setting synthetic resin second part. Any suitable adhesive agent of negligible or uniform thickness may be employed between the surfaces. The surfaces are preferably irregular; that is, they involve re-entrant or non-uniform curves, or angles; and roughness or irregularities of surface, amounting if necessary to actual projections to resist shear load, may be provided to enhance keying between the parts, to improve adhesion, or to transmit the greater loads such as centrifugal force, by pressure between parts of the total area of the surfaces rather than in shear.

Preferably the form and location of the joining surfaces is such that the first part of a blade forms the leading edge and the majority of the negatively loaded or forward surface, and the tip; whilst the second part forms the trailing-edge (except at the tip) and the majority of the positively loaded or rearward surface; and the joining surface lies mainly chordwise in the blade. Moreover, the joining surface is preferably somewhat sinuous in section line.

A preferred form of airscrew blade is illustrated diagrammatically by the accompanying drawing in which:

Figures 1A to 1E show cross sections of a composite blade which is shown in front elevation in Figure 2, and in side elevation in Figure 3, the radial stations at which the respective sections are taken being marked A, B, C, D and E, respectively.

Referring to the drawing, the stress-carrying portion of the blade is constituted by a relatively strong steel part 1 in the general form of a solid bulb plate over the major portion of its length, that is, a plate having a bulb or thickened flange along one of its edges, which plate in itself is sufficiently strong to withstand all the forces to which the blade is subjected. It terminates at the root end in a shank 2, adapted for connection to an air-screw hub, and further forms the solid tip 5. The central portion of the blade is completed by a non-metallic relatively less strong part 3. The metal part 1 is manufactured in much the same way as a complete metal blade, i. e., by being machined down from a blank and undergoing any necessary treatment. Its bulb or thickened flange is so constituted that it comprises the whole of the leading edge situated at 4 of the blade inward of the tip 5, preferably decreasing progressively in both width and thickness from the root of the blade toward its tip. For most of its length the bulb plate, as shown, is of substantially constant width but its plate portion is of progressively decreasing thickness from the blade root toward its tip and comprises part of one (the more convex or forward) surface of the blade and near the tip 5 forms the whole of this surface as can be seen in Figure 1A, and also forms the trailing portion of the blade, at 6. The remainder of the blade surface, i. e., most of the rearward face, is constituted by the non-metallic part 3 and this part 3 forms the trailing edge and a minor part of the forward surface as can be seen in Figures 1B to 1E. The metallic and non-metallic parts I and 3 are for most of the length of the blade united by the close contacting of their mutual surfaces at 7, which are irregular in the sense previously mentioned. This is done as follows: The part I is preformed in bulb plate form during its manufacture as illustrated, and the part 3 is moulded complementally to fill the angle of that formation and to be faired with both its plate and flange portions, in manufacture. The metallic surface at 7 is preferably sand-blasted, but it may be formed with projections or dimples for keying purposes to increase the bond between the parts.

The part 3 in the embodiment of the invention described, is formed of expanded rubber in the following manner. The part I is placed in a mould which is made to the form of the finished blade and the remaining space of the mould is occupied by the mixture which, when expanded and appropriately treated, will fill the remaining space in the mould under the pressure which is employed in processes for making expanded rubber mouldings, and the whole is then heated to perform the expansion and moulding process, and further or again heated as may be necessary to vulcanise the expanded rubber into a rigidly set condition. The part 3 is therefore constituted for a virtually rigid body comprising innumerable closed cells of hard rubber, the superficial surface being smooth and continuous. Any required cement or solutions may be applied to the metallic surface at 7 to assist the proper adhesion between the rubber and the metal. Any rough or ragged parts of the superficies may be machined off after the blade has been removed from the mould.

In a variation of this embodiment of the invention, the part 3 is made in a similar manner, i. e., by using the metallic surface at 7 virtually as a wall of a mould for synthetic resin, heating and pressing and thus setting and moulding the synthetic resin and causing its adhesion to the metal, thereafter machining off the superfluous resin, if any. In the case of use of resin, it may be found desirable to use a mould which, by its dimensions, will always result in over-size of the part 3 purposely so that it can be machined off to the required profile.

In the heating required in manufacture, the materials and temperature are so chosen and controlled that the mechanical properties of the metal part do not suffer.

It may be convenient in some cases to form the part 3 before causing its adhesion. In such case a master-element, or an appropriately formed mould, is employed and the part 3 is made as a separate element. After it is formed and set, it is then vulcanised to the part I; or caused to adhere (e. g. in the case of synthetic resin) by the use of an appropriate adhesive such as a thermosetting synthetic resin adhesive.

What I claim is:

1. An airscrew blade comprising a solid, metal, load-carrying member of generally angle shape extending throughout the major portion of the length of the blade, including a relatively wide and thin flange defining a portion of a blade face and a relatively narrow and thick flange defining the leading edge portion of the blade, and a solid trailing edge member of light, relatively weak material faired with both flange portions of said load-carrying member, filling the angle thereof, and secured thereto to complete a blade of generally airfoil shape.

2. An airscrew blade comprising a solid metal, load-carrying member extending throughout the length of the blade and over the major portion of its length constituting a bulb plate including a plate portion defining a portion of the forward, negative pressure face of the blade, and a thickened flange progressively tapering from the root of the blade toward its tip, defining the leading edge portion of the blade, and a trailing edge member of light, relatively weak material faired with both the plate and flange portions of the bulb plate, filling the angle thereof, and secured thereto to complete a blade of generally airfoil shape.

3. An airscrew blade comprising a solid metal, load-carrying member extending throughout the length of the blade and over the major portion of its length constituting a bulb plate of substantially constant width and including a plate portion of progressively decreasing thickness from the root of the blade toward the tip defining a portion of the forward, negative pressure face of the blade, and a thickened flange of progressively decreasing width and thickness from the root of the blade toward its tip, defining the leading edge portion of the blade, and a trailing edge member of light, relatively weak material faired with both the plate and flange portions of the bulb plate, filling the angle thereof, and secured thereto to complete a blade of generally airfoil shape.

4. An airscrew blade comprising a single metal part forming the leading edge and the majority of the forward negative pressure face of the blade, and a second part composed of material of less density than the first part forming the majority of the trailing edge and most of the rearward positive pressure face of the blade, said first part and said second part being shaped complementally and secured together adhesively to complete the blade.

5. An airscrew blade comprising a member formed for attachment to the hub, and of sufficient strength, and of such cross-section at each station, that by itself it is sufficiently strong to transmit to the hub all forces acting upon the blade as a whole, said member being so formed that its superficies define the major portion of the forward, negative pressure face of the blade as a whole and a complemental solid, homogeneous member of relatively less strong and materially less dense material adhesively jointed to the stronger member by a joint the larger portion of which extends chordwise of the blade, to transmit rotational stresses between said members in shear, and so formed that its superficies define the major portion of the positive pressure face of the blade and complement the stronger portion in defining the aerodynamic surfaces of the blade as a whole.

6. An airscrew blade comprising a solid homogeneous member formed at its root end for attachment to the hub, and of sufficient strength, and of such cross-section at each station, that by itself it is sufficiently strong to transmit to the hub all forces acting upon the blade as a whole, said member being so formed that its superficies define the leading edge portion and a material portion of the forward, negative pressure face of the blade as a whole, and the tip portion, but not the trailing edge portion nor a material portion of the blade's rear, positive pressure face, and a complemental solid, homogeneous member of relatively less strong and materially less dense material adhesively jointed to the stronger member by a joint the larger portion of which extends chordwise of the blade, to transmit rotational stresses between said members in shear, and so formed that its superficies define the major portion of the positive pressure face and the trailing edge portion, and complement the stronger portion to define the aerodynamic surfaces of the blade as a whole.

7. An airscrew blade comprising a single solid metal part concentrated in the vicinity of the blade's axis, and of sufficient strength and cross-section at each station, that by itself it is able to transmit to its root end all forces acting upon the blade as a whole, and a second solid part of relatively less strong and materially less dense material adhesively jointed to the metal part by a joint the larger portion of which extends chordwise of the blade substantially medially between its negative and positive pressure faces, to transmit rotational stresses between said members in shear, and formed to define substantially the entire trailing edge portion of the blade, the two parts being complementally formed to define the aerodynamic surfaces and outline of the blade as a whole.

FREDERICK METCALF THOMAS.